(12) United States Patent
Shim et al.

(10) Patent No.: US 10,841,052 B2
(45) Date of Patent: Nov. 17, 2020

(54) MULTI-NUMEROLOGY BASED DATA TRANSMITTING AND RECEIVING METHOD AND APPARATUS CAPABLE OF FREQUENCY HOPPING IN OFDM SYSTEM

(71) Applicant: Samsung Electronics Co., Ltd., Gyeonggi-do (KR)

(72) Inventors: Seijoon Shim, Seoul (KR); Chongdon Kim, Gyeonggi-do (KR); Hayoung Yang, Gyeonggi-do (KR); Joohyun Lee, Gyeonggi-do (KR); Chanho Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 15/926,469

(22) Filed: Mar. 20, 2018

(65) Prior Publication Data
US 2018/0278386 A1 Sep. 27, 2018

Related U.S. Application Data

(60) Provisional application No. 62/474,268, filed on Mar. 21, 2017.

(30) Foreign Application Priority Data

Jun. 20, 2017 (KR) .................. 10-2017-0077872

(51) Int. Cl.
H04L 5/00 (2006.01)
H04W 72/04 (2009.01)
(Continued)

(52) U.S. Cl.
CPC .......... *H04L 5/0012* (2013.01); *H04L 5/0007* (2013.01); *H04L 5/0053* (2013.01);
(Continued)

(58) Field of Classification Search
CPC ... H04L 5/0012; H04L 5/0007; H04L 5/0053; H04L 5/0094; H04W 72/0413;
(Continued)

(56) References Cited

U.S. PATENT DOCUMENTS

2012/0127910 A1 5/2012 Li
2012/0329400 A1* 12/2012 Seo ................... H04J 11/005
455/63.1

(Continued)

OTHER PUBLICATIONS

3GPP TSG RAN WG1 Meeting #85, R1-165425, Nanjing, China; May 23-27, 2016, pp. 1-10.
(Continued)

*Primary Examiner* — Christopher R Crompton
(74) *Attorney, Agent, or Firm* — The Farrell Law Firm, P.C.

(57) ABSTRACT

A base station for transmitting data in an OFDM system is provided. The base station is configured to convert data or a signal into a wireless band and transmit the converted data or signal to a terminal, down-convert a signal and output the down-converted signal, and generate a message for requesting terminal capability information for a sub-carrier spacing and transmit the message to the terminal accessing the base station, generate information on sub-bands of groups available to the terminal in response to receiving a terminal capability response message from the terminal and transmit the information on the sub-bands of groups available to the terminal, allocate a resource by selecting sub-bands of one group of the sub-bands of the groups available to the terminal in response to receiving a scheduling request message from the terminal and generate and transmit a resource allocation message, and transmit the data using the allocated resource.

24 Claims, 9 Drawing Sheets

(51) Int. Cl.
*H04W 72/08* (2009.01)
*H04W 72/12* (2009.01)

(52) U.S. Cl.
CPC ......... *H04L 5/0094* (2013.01); *H04W 72/042* (2013.01); *H04W 72/048* (2013.01); *H04W 72/0413* (2013.01); *H04W 72/0453* (2013.01); *H04W 72/085* (2013.01); *H04W 72/1231* (2013.01)

(58) Field of Classification Search
CPC ........... H04W 72/042; H04W 72/0453; H04W 72/048; H04W 72/085; H04W 72/1231
USPC ........................................................ 370/329
See application file for complete search history.

(56) References Cited

U.S. PATENT DOCUMENTS

| | | | |
|---|---|---|---|
| 2015/0181575 A1* | 6/2015 | Ng ........................ | H04L 5/0092 370/329 |
| 2016/0044619 A1* | 2/2016 | Ryu ....................... | H04W 76/14 370/350 |
| 2018/0034736 A1* | 2/2018 | Anchan .................. | H04L 47/14 |
| 2018/0132200 A1* | 5/2018 | Gheorghiu .............. | H04W 8/14 |
| 2019/0059075 A1* | 2/2019 | Hayashi ................ | H04L 5/0092 |
| 2019/0342902 A1* | 11/2019 | Wu .................... | H04W 72/1268 |
| 2019/0380153 A1* | 12/2019 | Damnjanovic ... | H04W 72/1273 |
| 2020/0059894 A1* | 2/2020 | Siomina ................ | H04L 5/0098 |
| 2020/0068557 A1* | 2/2020 | Lee ........................ | H04W 16/32 |
| 2020/0128585 A1* | 4/2020 | Kuang .................... | H04W 8/22 |

OTHER PUBLICATIONS

3GPP TSG RAN WG1 meeting #86, R1-166999, Gothenburg, Sweden, Aug. 22-26, 2016, pp. 1-5.

* cited by examiner

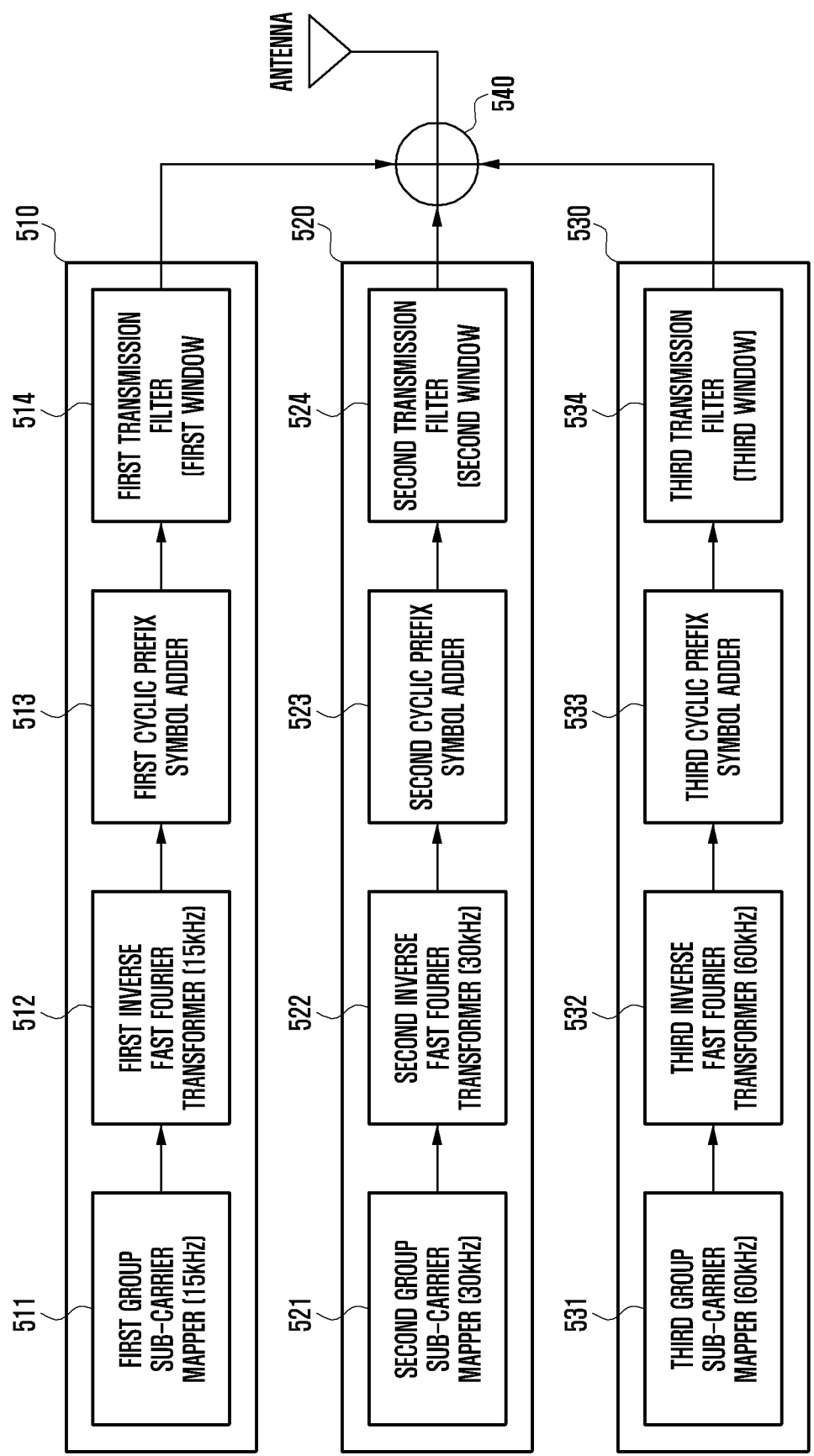

MULTI-NUMEROLOGY BASED DATA TRANSMITTING AND RECEIVING METHOD AND APPARATUS CAPABLE OF FREQUENCY HOPPING IN OFDM SYSTEM

CROSS-REFFERENCE TO RELATED APPLICATION(S)

This application claims priority under 35 U.S.C. § 119(e) to U.S. Provisional Patent Application Ser. No. 62/474,268, which was filed on Mar. 21, 2017, and under 35 U.S.C. § 119(a) to Korean Patent Application Serial No. 10-2017-0077872, which was filed in the Korean Intellectual Property Office on Jun. 20, 2017, the entire disclosure of each of these applications is incorporated by herein by reference.

BACKGROUND

1. Field

The disclosure relates, generally, to a data transmitting and receiving method and apparatus in an orthogonal frequency division multiplexing (OFDM) system, and more particularly, to a data transmitting and receiving method and apparatus capable of frequency hopping.

2. Description of Related Art

To meet a demand for radio data traffic, e.g., since commercialization of a 4G communication system, efforts have been made to develop an improved 5G communication system or a pre-5G communication system. The 5G communication system or the pre-5G communication system is sometimes referred to as a beyond 4G network communication system or a post LTE system.

To achieve a high data transmission rate, the 5G communication system is implemented in a super high frequency (mmWave) band (e.g., like 60 GHz band). To relieve a path loss of a radio wave and increase a transfer distance of the radio wave in the super high frequency band, in the 5G communication system, beamforming, massive multiple-input and multiple-output (MIMO), full dimensional MIMO (FD-MIMO), array antenna, analog beam-forming, and large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed.

In addition, in the 5G system, hybrid frequency-shift keying (FSK) and quadrature amplitude modulation (QAM) (FQAM) and sliding window superposition coding (SWSC), which are advanced coding modulation (ACM) schemes and a filter bank multi carrier (FBMC), a non-orthogonal multiple access (NOMA), and a sparse code multiple access (SCMA), which are advanced access technologies, and so on have been developed.

In a 5G system, cyclic prefix orthogonal frequency division multiplexing (CP-OFDM) in which broadband (supporting from a single cell to 100 MHz) multi-numerology is applied for the purpose of utilization of resources, transmission of massive data, etc. has been adopted in an enhanced mobile broadband (eMBB) system. The multi-numerology OFDM is a technique of differently applying a sub-carrier spacing according to a type of data traffic, and in the 5G, multi-numerology having a tone spacing such as 15 kHz, 30 kHz, 60 kHz, . . . , (15*2") kHz is being considered.

In the multi-numerology method, a frequency-time resource grid may be applied in various forms according to a type of data traffic. As such, when data, of which sub-carrier spacings are different from each other, overlap each other in a symbol area, since a symbol duration varies according to the sub-carrier spacing, interference occurs due to a multi-numerology sub-carrier.

SUMMARY

The disclosure has been made to address at least the disadvantages described above and to provide at least the advantages described below. Accordingly, an aspect of the disclosure provides a data transmitting and receiving method and apparatus that are capable of reducing interference by a multi-numerology sub-carrier.

Another aspect of the disclosure provides a data transmitting and receiving method and apparatus that are capable of efficiently using a frequency hopping method in a system using a multi-numerology sub-carrier.

In accordance with an aspect of the disclosure, there is provided a method for transmitting, by a base station, data in an orthogonal frequency division multiplexing (OFDM) system. The method includes transmitting, to a terminal accessing the base station, a message for requesting capability information of the terminal for a sub-carrier spacing, transmitting information on sub-bands of groups available to the terminal in response to receiving a terminal capability response message from the terminal, allocating a resource by selecting sub-bands of one group of the sub-bands of the groups available to the terminal in response to receiving a scheduling request message from the terminal, and transmitting the data using the allocated resource after transmitting a resource allocation message to the terminal.

In accordance with an aspect of the disclosure, there is provided a base station for transmitting data in an orthogonal frequency division multiplexing (OFDM) system. The base station includes a base station transmitter configured to convert one of data and a signal into a wireless band and transmit the converted one of data and signal to a terminal, a base station receiver configured to down-convert a signal received from the terminal and output the down-converted signal, and a base station controller configured to generate a message for requesting terminal capability information for a sub-carrier spacing and transmit the message to the terminal accessing the base station through the base station transmitter, generate information on sub-bands of groups available to the terminal in response to receiving a terminal capability response message from the terminal through the base station receiver and transmit the information on the sub-bands of groups available to the terminal through the base station transmitter, allocate a resource by selecting sub-bands of one group of the sub-bands of the groups available to the terminal in response to receiving a scheduling request message from the terminal through the base station receiver and generate and transmit a resource allocation message through the base station transmitter, and transmit the data using the allocated resource to the terminal.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 5A and 5B are block diagrams of a base station, according to an embodiment;

DETAILED DESCRIPTION

Figure 1:
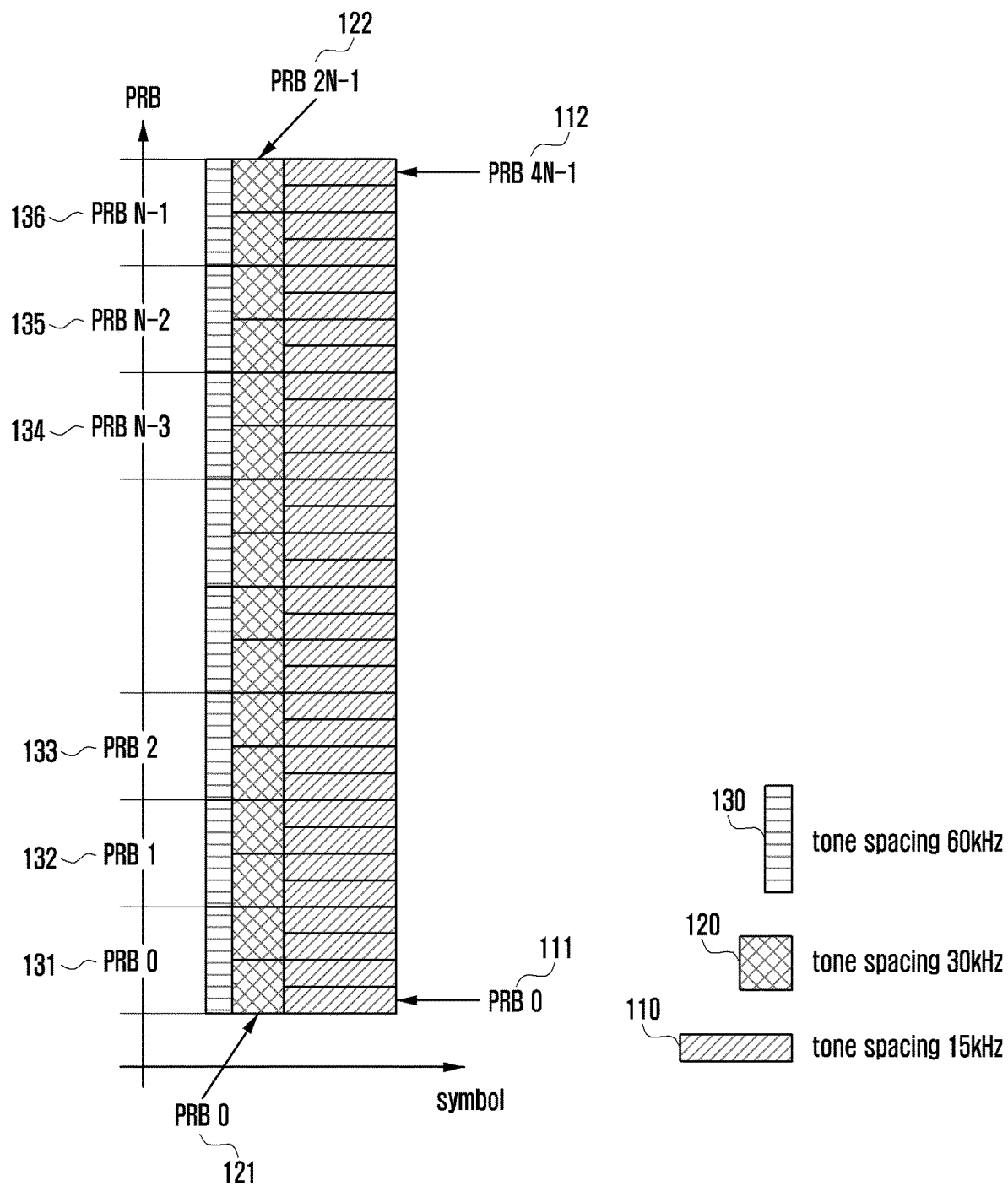
FIG. 1 is a diagram of sub-carrier spacing used in applying multi-numerology for utilization of resources in a 5G system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

When a common user filtered OFDM (CUF-OFDM) is applied by a base station, since sub-band hopping may be performed in OFDM in which transmission filtering is used, a frequency diversity gain may be obtained in a sub-band. Moreover, the base station can allocate terminals using the same numerology to a specific sub-band, thereby decreasing implementation complexity. Further, when a terminal user having large tone spacing is mapped to a high sub-carrier in the broadband, it is possible to secure system performance robust to Doppler frequency.

A sub-carrier spacing, in which multi-numerology is applied in a 5G system, will be described with reference to the accompanying drawings.

FIG. 1 is a diagram of sub-carrier spacing used in applying multi-numerology for utilization of resources in a 5G system, according to an embodiment.

A resource (physical resource block "PRB") 110 having a tone spacing of 15 kHz, a resource (PRB) 120 having a tone spacing of 30 kHz, and a resource (PRB) 130 having a tone spacing of 60 kHz is illustrated at the lower right corner of FIG. 1. The respective resources (PRBs) have different symbol lengths according to a frequency band. For convenience, the resource 110 having a tone spacing of 15 kHz will be referred to as a first resource, the resource 120 having a tone spacing of 30 kHz will be referred to as a second resource, and the resource 130 having a tone spacing of 60 kHz will be referred to as a third resource. In addition, although not illustrated in FIG. 1, as described above, the 5G system may further have one or more tone spacing resources having a tone spacing larger than the tone spacing of 60 kHz, e.g., according to 15*2 nkHz.

Hereinafter, descriptions will be provided only using resources having the tone spacings of the first to third resources 110 to 130. Different sub-carrier spacings are applied to the first resource 110, the second resource 120, and the third resource 130 according to a type of data traffic and a purpose. According to the sub-carrier spacing, when the third resource 130 is indexed in the entire bandwidth of the system of FIG. 1, the third resource 130 may be indexed as follows: a third resource 0 (PRB 0) 131, a third resource 1 (PRB 1) 132, a third resource 2 (PRB 2) 133, . . . , a third resource N−3 (PRB N−3) 134, a third resource N−2 (PRB N−2) 135, and a third resource N−1 (PRB N−1) 136.

Further, since the third resource 130 has a band of 60 kHz, when the second resource 120 having a band of 30 kHz corresponding to a half of that of the third resource 130 is indexed, the second resource 120 has indexing values of a second resource 0 (PRB 0) 121, . . . , and a second resource 2N−1 (PRB 2N−1) 122, which are two times those of the third resource 130. That is, the second resource 120 may be subdivided into more resources in view of the PRB. Accordingly, when the first resource 110 having a band of 15 kHz is indexed, the first resource 110 has indexing values of a first resource 0 (PRB 0) 111, . . . , and a first resource 4N−1 (PRB 4N−1) 112, which are four times those of the third resource 130.

When data is transmitted while having different sub-carrier spacings as illustrated in FIG. 1, data having different spacings overlap each other in a symbol area in which data is actually transmitted. Due to this overlap, interference between sub-carriers having different spacings occurs.

The interference between the sub-carriers may be reduced by using Tx filtering with respect to a signal emitted out-of-band (out-of-band emission "OOBE"). Such a waveform is typically referred to as a filtered CP-OFDM.

Hereinafter, a description for providing a method and apparatus for applying frequency hopping in a filtered CP-OFDM and an apparatus and method for transmitting and receiving a control signal will be provided.

Generally, in order to use the filtered CP-OFDM, i.e. to apply filtering to CP-OFDM data, data should be transmitted in consecutive sub-bands, since the filtering is applied to confine the OOBE occurring in a specific sub-band.

In a broadband communication system, since a band is very broad, data transmission characteristics of the respective sub-bands may be different from each other. That is, a specific sub-band may have an excellent data transmission characteristic, and another specific sub-band may have a poor data transmission characteristic.

In a broadband communication system, data may be allocated to consecutive sub-bands in a specific band; a transmission characteristic of a specific sub-band of the consecutive sub-bands allocated for data transmission may be poor, which is referred to as "sub-band null". When there is a sub-band having a poor transmission characteristic among the consecutive sub-bands allocated for data transmission, data reception performance of a receiver is deteriorated.

Further, when applying sub-band filtering and the base station applies filtering for each user, Tx filtering should be applied to a time domain signal for each user. Accordingly, when a number of users are using massive data, e.g., eMBB data in the broadband system, complexity for implementing a base station may be significantly increased.

Therefore, the disclosure provides an apparatus and method for resolving reception performance deterioration due to sub-band nulling, which may occur when data is transmitted in consecutive sub-bands, using the filtered OFDM method.

The disclosure provides a method and apparatus for providing a CUF-OFDM method capable of applying frequency hopping and sub-band hopping by using the filtered OFDM method.

The CUF-OFDM suggested in the disclosure may allocate users having the same numerology to a specific sub-band and apply the same filtering and inverse fast fourier transform (IFFT), thereby decreasing system complexity.

The disclosure provides a method for signaling between a base station and a terminal for allocating the same numerology to a specific sub-band, and an apparatus for the same.

The disclosure provides a method for arrangement of each sub-band of multi-numerology capable of improving reception performance of a terminal, and an apparatus for using the same.

Figure 2:
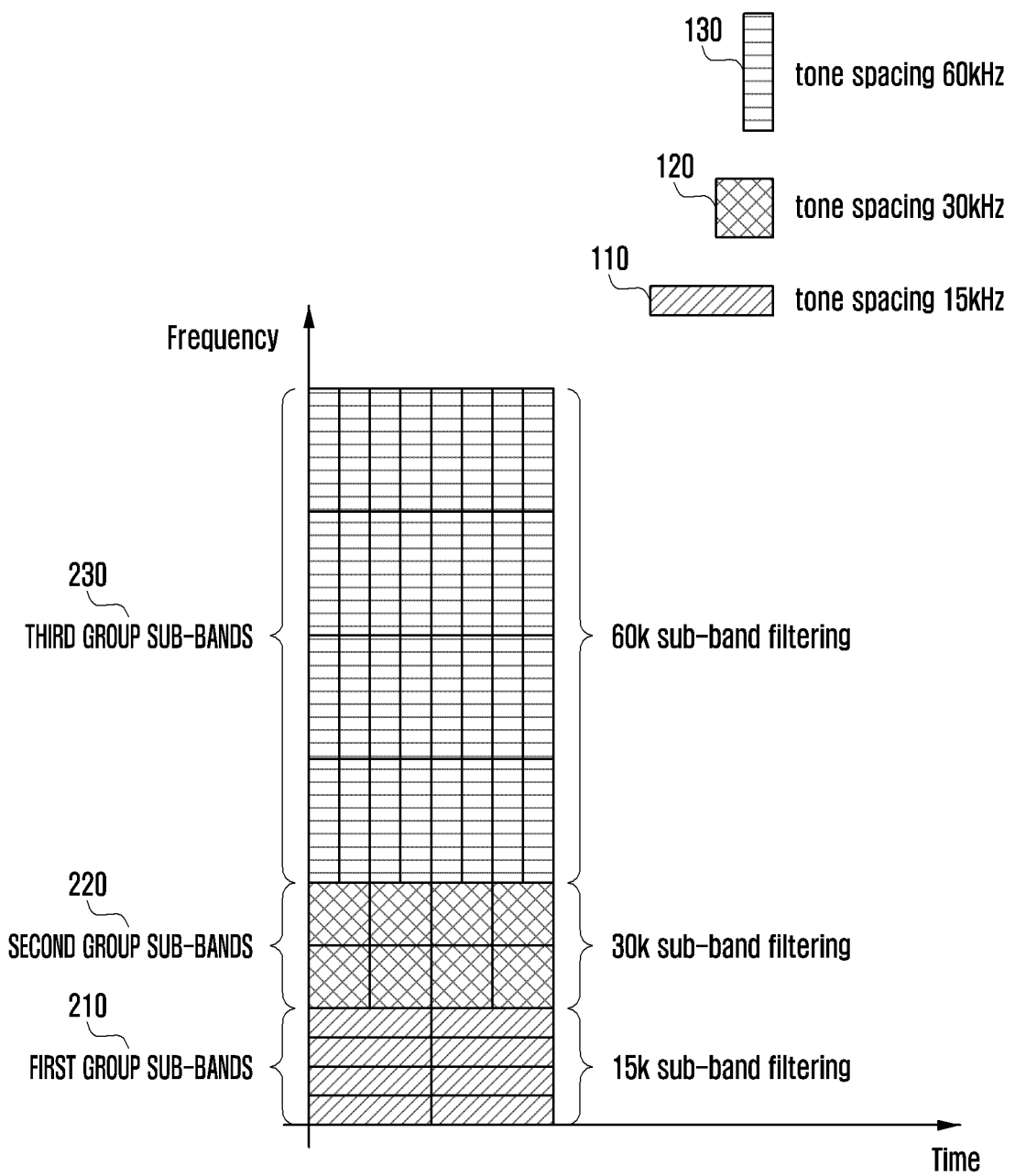
FIG. 2 is a diagram of sub-bands for transmitting data having different tone spacings in a broadband system, according to an embodiment.

FIG. 2 is a diagram of sub-bands for transmitting data having different tone spacings in a broadband system, according to an embodiment.

Referring to FIG. 2, in the broadband system, the entire bandwidth is divided into a plurality of sub-bands that may be provided by the system. In FIG. 2, some consecutive sub-bands in the entire bandwidth are classified into a first group sub-bands 210, a second group sub-bands 220, and a third group sub-bands 230 based on a spacing. It is assumed that the sub-carrier spacing is the three sub-carrier spacings as described in FIG. 1. That is, only the resource 110 having a tone spacing of 15 kHz, the resource 120 having a tone spacing of 30 kHz, and the resource 130 having a tone spacing of 60 kHz are illustrated. However, as described above, resources having a sub-carrier spacing larger than the sub-carrier spacing of 60 kHz may also exist. In this case, as described above, the sub-carrier spacing may be applied according to 15*2 n kHz.

The entire bandwidth may be divided into groups having two or more sub-carriers based on two or more sub-carrier spacings, and each group may be configured to include a plurality of sub-bands based on the corresponding sub-carrier spacing, e.g., configured as a "multi-numerology" band.

Further, the sub-carrier spacing may be referred to as a sub-carrier tone spacing, a tone spacing, a sub-carrier spacing, a sub-carrier tone spacing, etc.

The base station can configure a frequency band as a multi-numerology band in one or more various configurations. For example, the entire bandwidth may be configured as a multi-numerology band, and only some predetermined bands of the entire bandwidth may be configured as a multi-numerology band. The predetermined bands as the multi-numerology band may be plural. For example, when only one multi-numerology band is configured among some bands of the entire bandwidth, a band from the lowest frequency band to a specific frequency band in the entire bandwidth may also be configured as a multi-numerology band. As another example, only a band from the highest frequency band to a specific frequency band in the entire bandwidth may be configured as a multi-numerology band. As yet another example, a band at an intermediate position in the entire bandwidth may be configured as a multi-numerology band. Further, when two or more multi-numerology bands are configured, the above examples may be used in combination.

When a resource is allocated to a terminal, e.g., when a multi-numerology band is configured, the resource may be divided into two cases/or categories. First, the first group sub-bands 210, the second group sub-bands 220, or the third group sub-bands 230 may be allocated according to a capability of the terminal. For example, when the terminal supports only a tone spacing corresponding to the first group sub-bands 210, the base station should allocate only a resource of the first group sub-bands 210 when allocating a resource to the terminal. When the base station allocates sub-bands of other groups, the terminal cannot process received data.

When capability of the terminal supports only the second group sub-bands 220, the base station should allocate only a resource of the second group sub-bands 220 when allocating a resource to the terminal. Similarly, when the terminal supports only the third group sub-bands 230, the base station needs to allocate only a resource of the third group sub-bands 230 when allocating a resource to the terminal. As such, the base station may allocate a resource of a multi-numerology band based on capability of the terminal.

When the terminal may support sub-bands of all groups, the base station may select and transmit one or multi-numerology resources based on a required service transmission rate, an amount (size) of data, a required service quality, and the like.

In either instance, e.g., one sub-carrier spacing and two or more sub-carrier spacings, data transmission and reception may be performed only using a resource of one specific group configured when communication is performed in the base station. For example, when the base station allocates a resource of the first group sub-bands 210 to a specific terminal, data may be transmitted and received between the base station and the terminal using only the resource of the first group sub-bands 210 while data communication is performed.

Users using a specific sub-band may apply the same sub-carrier spacing. Therefore, the same size of IFFT and the same Tx filtering may be applied to data to be transmitted to the terminals applying the same sub-carrier spacing. In addition, data may be received by the terminal using only one sub-carrier spacing. Further, when a specific terminal performs communication in sub-bands of a specific group in a band configured as a multi-numerology band, the base station may perform sub-band hopping when transmitting data to the terminal. By performing the sub-band hopping as described above, it is possible to minimize deterioration due to the sub-band nulling, and obtain sub-band diversity gain.

When sub-bands of the respective groups are configured as a multi-numerology band by using the whole of the entire bandwidth or part of the entire bandwidth as illustrated in FIG. 2, positions of the first group sub-bands 210, the second group sub-bands 220, and the third group sub-bands 230 may be different from those illustrated in FIG. 2.

The first group sub-bands 210 may be disposed in the highest frequency band, and may be disposed in a position of the second group sub-bands 220 which is the intermediate frequency band. Similarly, the second group sub-bands 220 and the third group sub-bands 230 may also be disposed in other frequency bands.

Further, when the first group sub-bands 210, the second group sub-bands 220, and the third group sub-bands 230 are configured as a multi-numerology band, the number of sub-bands of each group may be variable. For example, when users located in an area of the base station use more data that may be allocated to the resource 110 having a tone spacing of 15 kHz, a frequency resource of the first group sub-bands 210 may be increased.

When the users located in the area of the base station use more data that may be allocated to the resource 120 having a tone spacing of 30 kHz, a frequency resource of the second group sub-bands 220 may be increased. Similarly, when the users located in the area of the base station use more data that may be allocated to the resource 130 having a tone spacing of 60 kHz, a frequency resource of the third group sub-bands 230 may be increased.

When a frequency resource configured as a multi-numerology band in the base station is limited to a frequency resource of a predetermined range, the number of sub-bands, as the number of sub-bands in a specific group is increased, the number of sub-bands in which data transmission is relatively infrequent may be decreased accordingly.

However, since adoption of the method of increasing or decreasing the number of sub-bands in a specific group may cause communication failure of other terminals, it may be preferable that a multi-numerology band is configured in advance.

Accordingly, a base station in accordance with the disclosure may provide information on a multi-numerology band and may be configured in advance to a terminal entering the base station or attempting initial access in advance by using system information or higher layer signaling.

Figure 3:
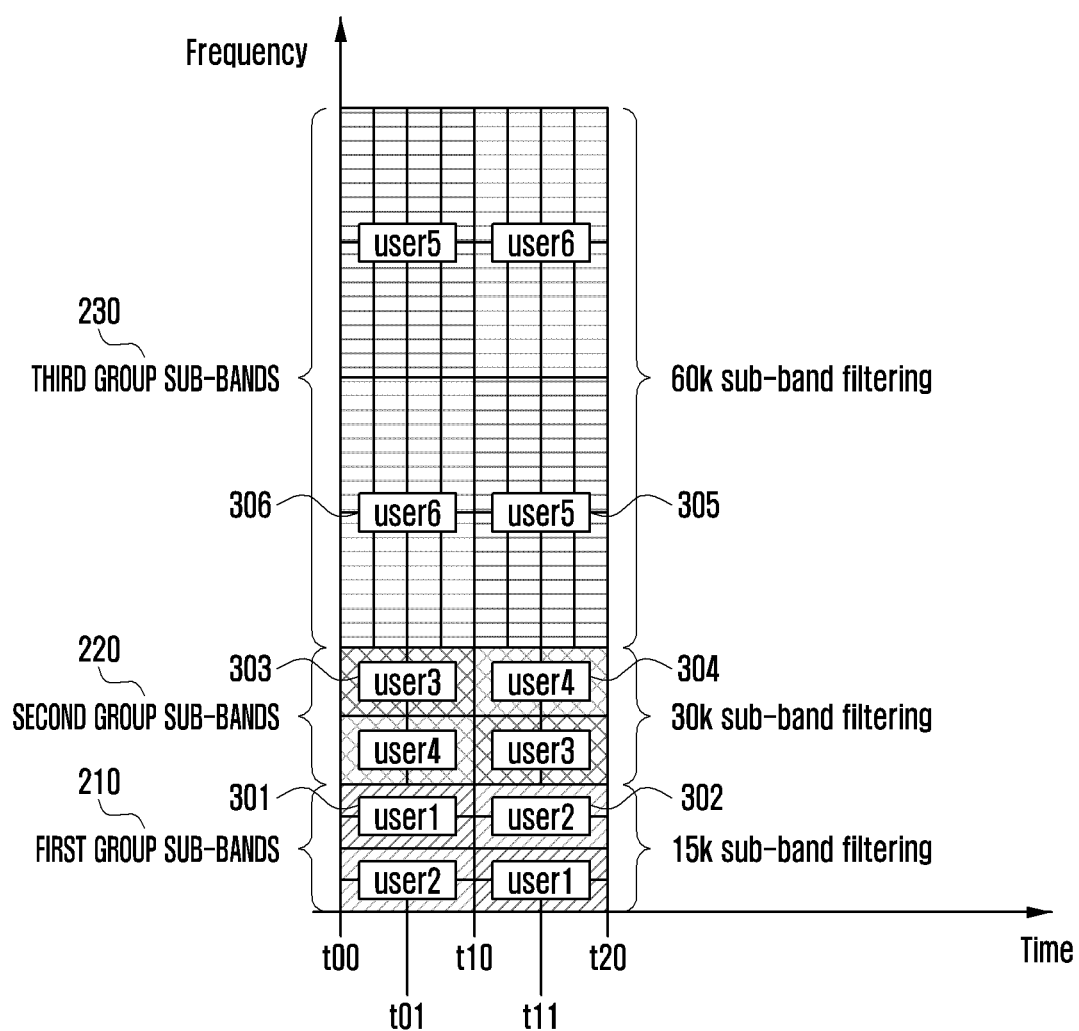
FIG. 3 is a diagram of applying frequency hopping for each terminal by configuring a multi-numerology band in a broadband system, according to an embodiment.

FIG. 3 is a diagram for applying frequency hopping for each terminal by configuring a multi-numerology band in a broadband system, according to an embodiment.

Each terminal is classified as one user, and each user may perform communication by receiving allocation of a resource from sub-band of a specific group. More specifically, a first user 301 and a second user 302 can receive allocation of a resource of the first group sub-bands 210, a third user 303 and a fourth user 304 can receive allocation of a resource of the second group sub-bands 220, and a fifth user 305 and a sixth user 306 can receive allocation of a resource of the third group sub-bands 230.

The base station may transmit data to the first user 301 and data to the second user 302 using the resource of the first group sub-bands 210 from a point in time of t00 to a point in time of t10. The base station may transmit the data to the second user 302 using a resource of the lowest band among the first group sub-bands 210, and may transmit the data to the first user 301 using a resource of the highest band among the first group sub-bands 210. The frequency hopping method may be applied from a point in time of t10, which is the next point in time to a point in time of t20. That is, from the point in time of t10 to the point in time of t20, the base station may transmit the data to the first user 301 using a resource of the lowest band among the first group sub-bands 210, and may transmit the data to the second user 302 using a resource of the highest band among the first group sub-bands 210.

The third user 303 and the fourth user 304 are allocated to the second group sub-bands 220. Accordingly, the base station may transmit data to the respective users 303 and 304 using the allocated resource from the point in time of t00 to the point in time of t10, and may transmit data to the users 303 and 304 using other sub-bands among the second group sub-bands by applying frequency hopping from the point in time of t10, which is the next point in time to the point in time of t20.

Further, the fifth user 305 and the sixth user 306 are allocated to the third group sub-bands 230. Accordingly, the base station may transmit data to the respective users 305 and 306 using the allocated resource from the point in time of t00 to the point in time of t01, and may transmit data to the respectively users 305 and 306 using other sub-bands among the second group sub-bands by applying frequency hopping from the point in time of t10, which is the next point in time to the point in time of t20.

In FIG. 3 the same time period as that of the first group sub-bands 210 is used. That is, FIG. 3 illustrates an example in which data transmission is performed using the second group sub-bands 220 and the third group sub-bands 230 during the same time period as a time period from t00 to t10 and a time period from t10 to t20, which are a data transmission period of the first group sub-bands, and the frequency hopping is performed in the same unit.

However, in the second group sub-bands 220, the frequency hopping in a more subdivided unit as compared to the first group sub-bands 210 is possible. Therefore, in the second group sub-bands 220, a cycle different from the frequency hopping cycle in the first group sub-bands 210 may be set. Similarly, even for the third group sub-bands 230, the frequency hopping may be performed at a more subdivided cycle than the frequency hopping cycles of the first group sub-bands 210 and the second group sub-bands 220. For example, for data of the second group, a frequency hopping cycle that a period from the point in time of t00 to the point in time of t01 and a period from the point in time of t01 to the point in time of t10 are divided may be used. When the frequency hopping cycle is changed as described above, the terminal receiving data in the second group may receive data by the frequency hopping method according to the corresponding cycle. Accordingly, a period from the point in time of t10 to the point in time of t20 may also be more subdivided into a period from the point in time of t10 to the point in time of t11 and a period from the point in time of t11 to the point in time of t20.

Therefore, in the third group sub-bands 230, the same hopping cycle as that of the second group sub-bands may be set, and the frequency hopping cycle may also be set in a more subdivided point in time unit.

As such, when the frequency hopping cycle is different for each group, information on the frequency hopping cycle of each group may be set as standard, and may also be transmitted to the terminal using system information or higher layer signaling.

Since the same sub-carrier spacing is applied for the users allocated to the sub-bands 210, 220, and 230 of the respective groups, the base station may apply the same size of IFFT and the Tx filtering to data transmitted to the terminal in a specific group. Further, as described above, since all terminals (users) allocated in the sub-bands 210, 220, and 230 of the respective groups have the same sub-carrier spacing, the frequency hopping to another sub-carrier in the same group may also be easily performed. Through this, deterioration due to the sub-band nulling may be minimized, and sub-band diversity gain may be obtained in the same group.

Figure 4:
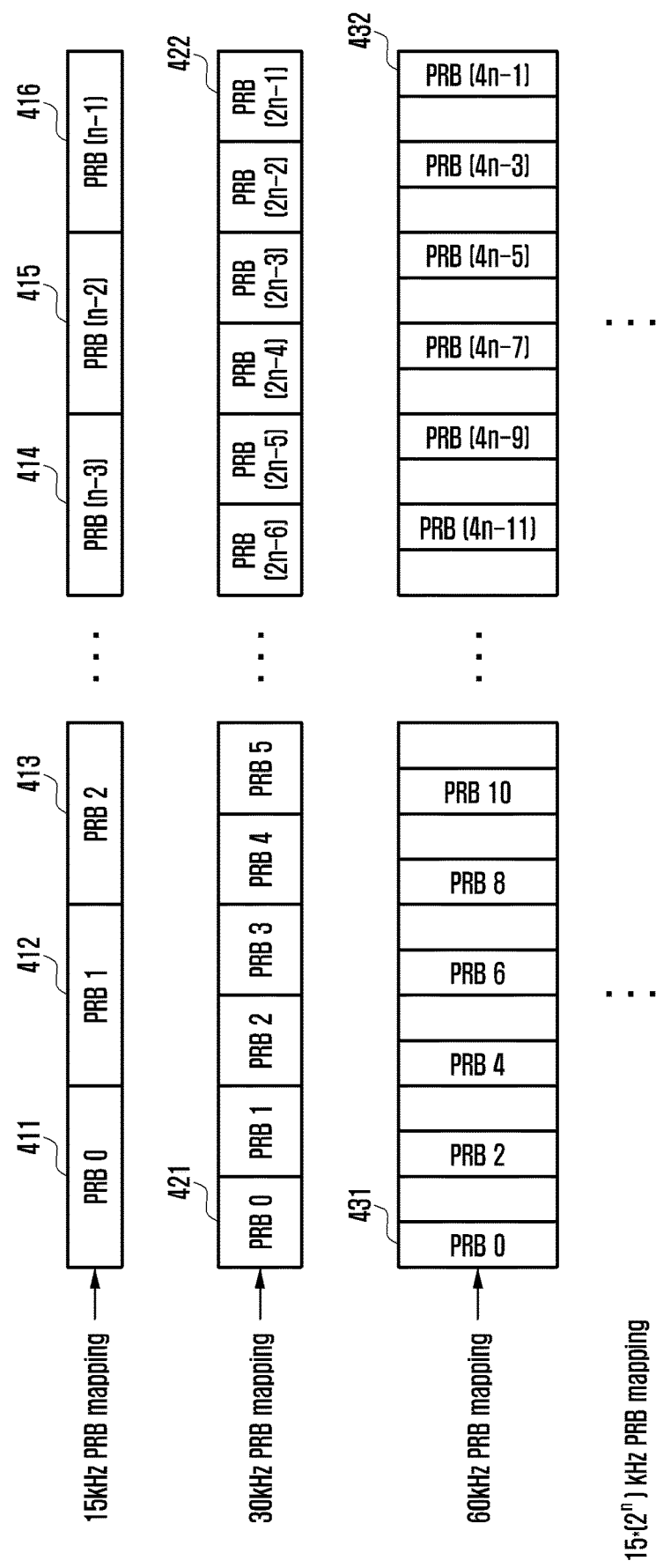
FIG. 4 is a diagram of resource block indexing for allocating a resource to a multi-numerology band, according to an embodiment.

FIG. 4 is a diagram e of resource block indexing for allocating a resource to a multi-numerology band, according to an embodiment.

In order to transmit data, the base station may allocate a resource by defining PRB indexing for each sub-carrier spacing in advance and indicating a specific PRB index to each user (terminal). A group using a sub-carrier spacing may be first configured between the base station and the terminal according to capability of the terminal and/or a type of data. As such, a resource may be allocated using a resource index allocated in the sub-carrier spacing configured in advance.

Hereinafter, PRB mapping for resource allocation will be described with reference to FIG. 4. The first group sub-bands 210 have PRBs of 15 kHz as described above. When it is assumed that the number of PRBs which are resource blocks included in the first group sub-bands 210 is n, the indexing may be performed from a PRB 0 411 of 15 kHZ, a PRB 1 412 of 15 kHZ, a PRB 2 413 of 15 kHZ, . . . , a PRB (n−3) 414 of 15 kHZ, a PRB (n−2) 415 of 15 kHZ, and a PRB (n−1) 416 of 15 kHZ.

The second group sub-bands 220 have PRBs of 30 kHz as described above. The PRBs, which are resource blocks included in the second group sub-bands 220, utilize indexing values two times those of the PRBs of 15 kHz. Accordingly, when the number of PRBs of 15 kHz is n, the number of PRBs of 30 kHz may be 2n. Therefore, the PRBs of 30 kHz may perform indexing from a PRB 0 421 to a PRB (2n−1) 422 of 30 kHz.

The third group sub-bands 230 have PRBs of 60 kHz as described above. The PRBs which are resource blocks included in the third group sub-bands 230 require indexing values four times those of the PRBs of 15 kHz. Accordingly, when the number of PRBs of 15 kHz is n, the number of PRBs of 60 kHz may be 4n. Therefore, the PRBs of 60 kHz may perform indexing from a PRB 0 431 to a PRB (4n−1) 432 of 30 kHz.

Indexes of the PRBs having a resource of $15 \times 2^n$ may be mapped as described above.

The base station may classify the entire bandwidth or some bands for each numerology, and allocate only an index of a resource to the terminal (user) using the same numerology, thereby performing resource allocation. When the resource is allocated as described above, a frequency hopping method and a position of a sub-carrier where the hopping is performed may be obtained using only the allocated resource index even at the time of frequency hopping.

When the base station uses frequency hopping using the frequency resource index, the base station may apply the frequency hopping according to a predetermined method for providing channel quality information.

The terminal may report channel quality information at a predetermined cycle or at a point in time indicated by the base station. For example, the terminal may provide channel quality information to the base station by using PRB channel quality indication (P-CQI) or sub-band channel quality information (SB-CQI). The base station may obtain resource information for providing frequency hopping to the terminal, and allocate a resource by appropriately selecting a sub-carrier where the hopping is performed when providing the sub-carrier hopping to the terminal. To this end, the following operations may be performed.

First, in order to use the sub-carrier hopping, negotiation is required for a sub-carrier available to the terminal according to numerology between the base station and the terminal. Then, a terminal hopping pattern that may be used within a predetermined sub-carrier is performed.

Second, in order to use the sub-carrier hopping, a feedback channel for receiving PRB channel quality indication information or sub-band channel quality indication information based on which the base station may recognize a channel state of the terminal is performed. Further, the base station needs to provide the terminal with resource mapping information including PRB mapping information on which PRB is to be used.

By using the above-described method, the base station according to the disclosure may provide frequency hopping when using the multi-numerology method more efficiently. Further, it is possible to decrease complexity of the base station and prevent sub-band nulling from occurring in the terminal.

Figure 5A:
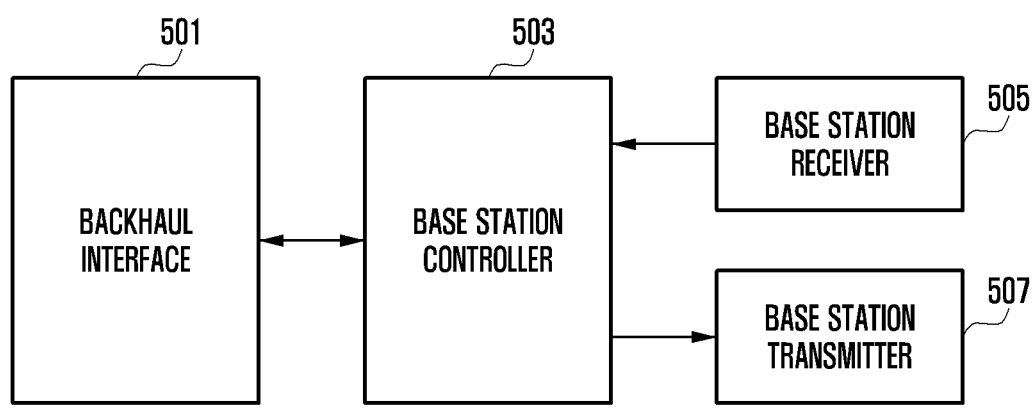

FIGS. 5A and 5B are diagrams of a base station, according to an embodiment. Referring to FIG. 5A, a base station may include a backhaul interface 501, a base station controller 503, a base station receiver 505, and a base station transmitter 507.

The base station backhaul interface 501 may provide an interface with a higher layer node or other base stations. An interface between a base station and a higher layer node and an interface between a base station and other base stations may be different from each other, which will be collectively referred to as a backhaul interface.

The base station controller 03 may control an overall operation of the base station. Further, when applying multi-numerology, the base station controller 503 may perform processing on resource allocation, communication using an allocated resource, frequency hopping, reception of channel quality information for resource allocation. The base station controller 503 may include one processor or a plurality of processors. Further, the base station controller 503 may further include a memory for storing control information as needed. Further, the base station controller 503 may include a communication processor for performing encoding and decoding, and may also include a scheduler for transmitting data to the terminal.

The base station receiver 50 may convert a signal of a wireless band received from the terminal into a signal of a base band, covert an analog signal into a digital signal, and provide the converted signal to the base station controller 503. Further, the base station receiver 505 may receive channel quality information received from the terminal and provide the received information to the base station controller 503.

The base station transmitter 507 may convert a digital signal to be transmitted from the base station received from the base station controller 503 into an analog signal, increase a bandwidth, and increase power for performing transmission.

FIG. 5B is a block diagram of the base station transmitter 507, according to an embodiment.

The base station transmitter 507 may include transmitters of the respective groups corresponding to multi-numerology methods. FIG. 5B illustrates a configuration in which the respective sub-carriers are classified into three different groups, e.g., as described above with reference to FIG. 3. A first transmitter 510 is for mapping and transmitting first group sub-carriers, a second transmitter 520 is for mapping and transmitting second group sub-carriers, and a third transmitter 530 is for mapping and transmitting third group sub-carriers.

The respective group transmitters 510, 520, and 530 have functionally the same configuration. For example, the first transmitter 510 may include a first group sub-carrier mapper 511, a first inverse fast Fourier transformer 512, a first cyclic prefix symbol adder 513, and a first transmission filter 514. The second transmitter 520 may include a second group sub-carrier mapper 521, a second inverse fast Fourier transformer 522, a second cyclic prefix symbol adder 523, and a second transmission filter 524. Lastly, the third transmitter 530 may include a third group sub-carrier mapper 531, a third inverse fast Fourier transformer 532, a third cyclic prefix symbol adder 533, and a third transmission filter 534.

The group sub-carrier mappers 511, 521, and 531 of the respective group included in the first group transmitter 510 to the third group transmitter 530 may map data to be transmitted to a band of a corresponding sub-carrier, respectively. This may be the form of mapping data to be transmitted to a sub-carrier spacing of a corresponding group described above in FIG. 3.

The data mapped to the respective sub-carriers are input to the inverse fast Fourier transformers 512, 522, and 523 according to the form in which the data is mapped to the corresponding sub-carrier spacing. Accordingly, the inverse fast Fourier transformers 512, 522 and 532 may perform inverse fast Fourier transform on the respective input data. Signals output from the respective inverse fast Fourier transformers 512, 522, and 523 may be input to corresponding cyclic prefix symbol adders 513, 523, and 533. The cyclic prefix symbol adders 513, 523, and 533 may generate an OFDM symbol by adding a cyclic prefix symbol having a size corresponding to the sub-carrier spacing to the output signal.

The OFDM symbols generated in the respective cyclic prefix symbol adders 513, 523, and 533 are input to corresponding transmission filters 514, 524, and 534, respectively. The respective transmission filters 514, 524, and 534 may be filters for removing interference of a sub-carrier as described above. That is, the transmission filters 514, 524, and 534 may remove the OOBE phenomenon. Signals processed in the respective transmission filters 514, 524, and 534 may be combined to the entire bandwidth by a combiner 540, and the combined signal may be transmitted through an antenna.

In FIG. 5B, one antenna is shown, but a plurality of antennas can be used, and particularly, a MIMO method may be used.

By using the configuration in FIG. 5B, it is possible to decrease complexity of the base station since only one inverse fast Fourier transformer and one transmission filter are provided for a sub-carrier present in one group.

Figure 6A:
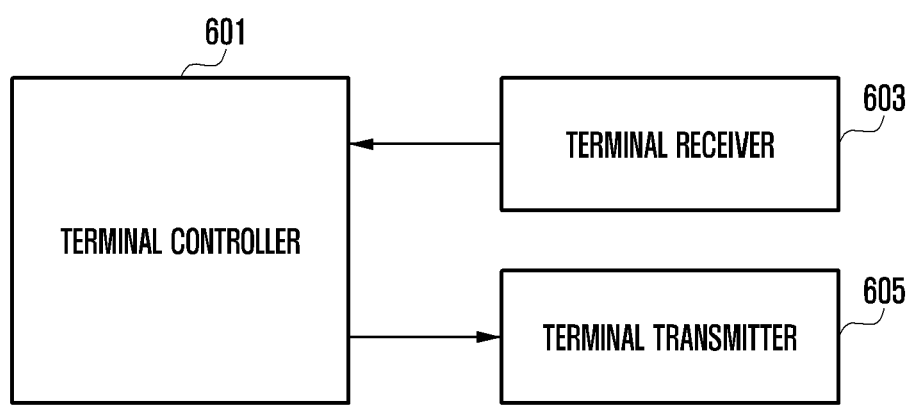
FIGS. 6A and 6B are diagrams of a terminal, according to an embodiment.
Figure 6B:
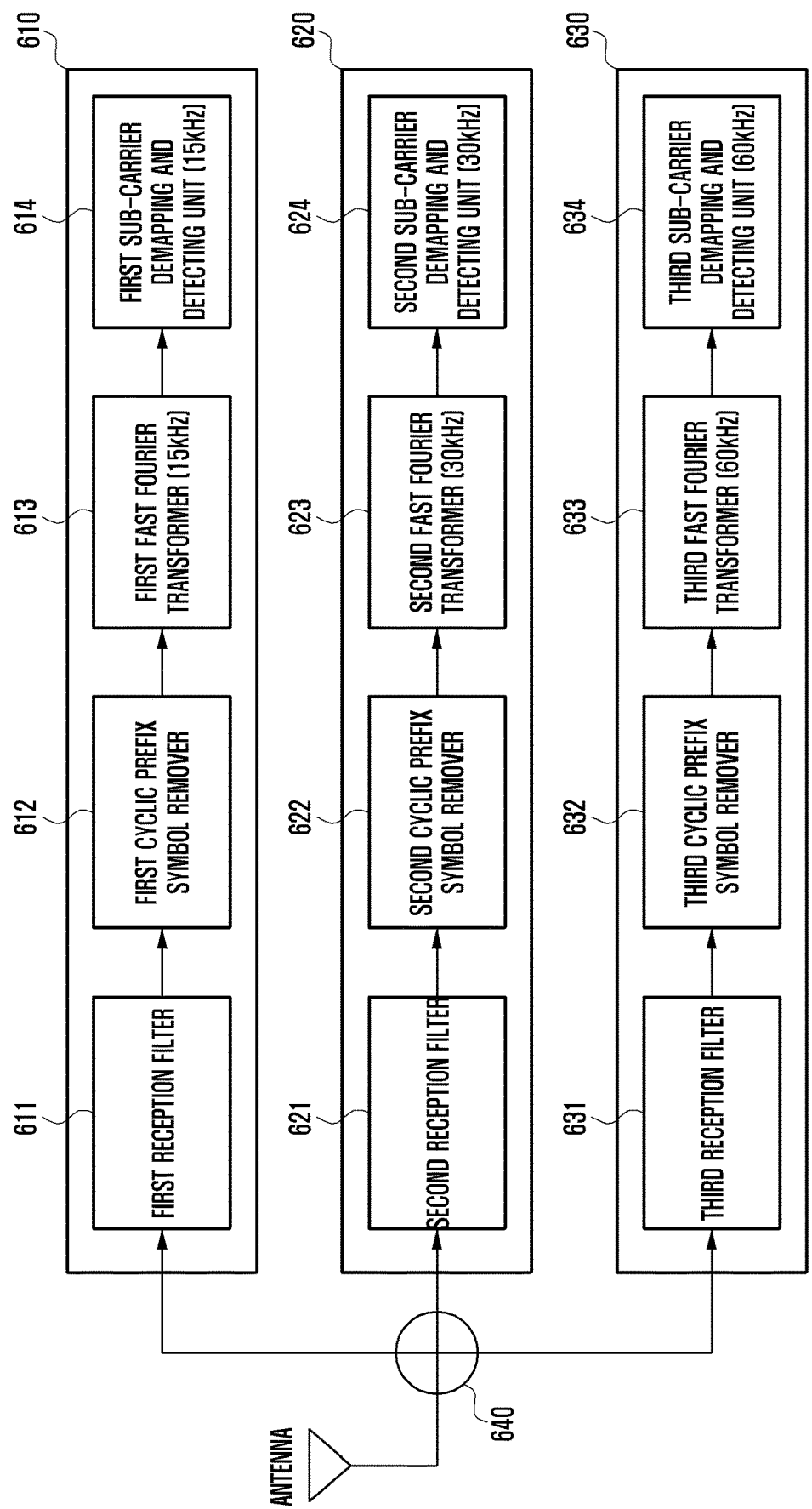

FIGS. 6A and 6B are diagrams of a terminal, according to an embodiment.

Referring to FIG. 6A, a terminal may include a terminal controller 601, a terminal receiver 603, and a terminal transmitter 605. In addition, the terminal may include a memory, a display, a user input unit, and the like, and may further include other additional functional blocks as needed.

The terminal controller 601 may control an overall operation of the terminal. Further, the terminal controller 601 may receive data using a resource allocated by the system applying multi-numerology, and may provide channel quality information periodically or upon request from the base station. The channel quality information may be PRB channel quality indication information or sub-band channel quality indication information. The terminal controller 601 may include one processor or a plurality of processors.

The terminal receiver 603 may convert a signal of a wireless band received from the base station into a signal of a base band, covert an analog signal into a digital signal, and provide the converted signal to the terminal controller 601. Further, the terminal receiver 603 may receive data using the multi-numerology method from the base station and provide the data to the terminal controller 601.

The terminal transmitter 605 may convert a digital signal to be transmitted to the base station into an analog signal, increase a bandwidth, and increase power for performing transmission.

FIG. 6B is a block diagram of the terminal receiver 603, according to an embodiment.

The terminal receiver 603 may include receivers of the respective groups corresponding to multi-numerology methods. However, the terminal receiver 603 may also include only one receiver according to capability of the terminal.

Referring to FIG. 6B, the terminal receiver 603 may include an antenna, a distributor 640, and one or more group receivers 610, 620, and 630. When only one receiver is included, the terminal may not include the distributor 640. Further, the terminal receiver may include one receiver or a plurality of receivers according to capability of the terminal as described above.

Similarly to FIG. 5B described above, FIG. 6B illustrates a configuration in which the respective sub-carriers are classified into three different groups as in the example described above with reference to FIG. 3. A first receiver 610 is for receiving first group sub-carriers, a second group receiver 620 is for receiving second group sub-carriers, and a third group receiver 630 is for receiving third group sub-carriers.

The respective group receivers 610, 620, and 630 have functionally the same configuration. For example, the first group receiver 610 may include a first reception filter 611, a first cyclic prefix symbol remover 612, a first fast Fourier transformer 613, and a first sub-carrier demapping and detecting unit 614. The second group receiver 620 may include a second reception filter 621, a second cyclic prefix symbol remover 622, a second fast Fourier transformer 623, and a second sub-carrier demapping and detecting unit 624. The third group receiver 630 may include a third reception filter 631, a third cyclic prefix symbol remover 632, a third fast Fourier transformer 633, and a third sub-carrier demapping and detecting unit 634.

The respective reception filters 611, 621, and 631 included in the first group receiver 610 to the third group receiver 630 may filter a received signal and output the filtered signal. The terminal may include only one receiver, or even when the terminal include two or more receivers, only a receiver corresponding to one group may be operated in most cases. Therefore, the first group receiver 610 may be described as an operation representative of the three group receivers 610, 620, and 630.

The first reception filter 611 of the first group receiver 610 filters a received signal and outputs the filtered signal to the first cyclic prefix symbol remover 612. The first cyclic prefix symbol remover 612 removes a cyclic prefix symbol according to a sub-carrier spacing of 15 kHz band which is a corresponding band, and outputs the signal from which the cyclic prefix symbol is removed to the first fast Fourier transformer 613. The first fast Fourier transformer 613 may also perform fast Fourier transform according to a sub-carrier spacing of 15 kHz band which is a corresponding band. As such, the signal subject to the fast Fourier transform by the first fast Fourier transform is input to the first sub-carrier demapping and detecting unit 614. The first sub-carrier demapping and detecting unit 614 may perform demapping on a sub-carrier allocated to the terminal itself in the 15 kHz band to detect and output data allocated to the terminal itself. The data output from the first sub-carrier demapping and detecting unit 614 may be processed by the terminal controller 601.

Figure 7:
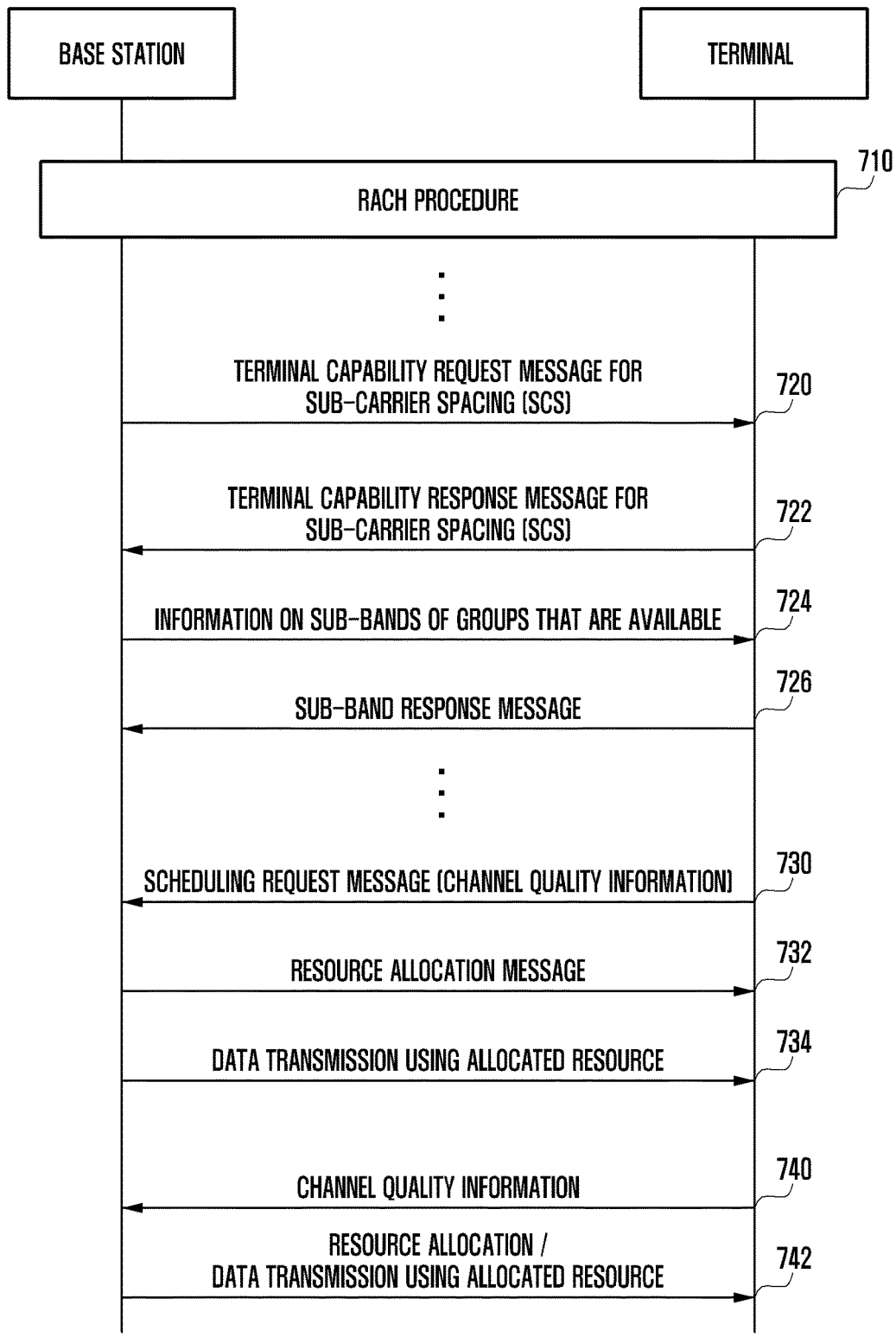
FIG. 7 is a flowchart of a method for sub-carrier spacing during transmission and reception of data between a base station and a terminal, according to an embodiment.

FIG. 7 is a flowchart of a method for sub-carrier spacing during transmission and reception of data between a base station and a terminal, according to an embodiment.

Referring to FIG. 7, the terminal and the base station may perform a random access channel (RACH) procedure in step 710. The RACH procedure may be performed when the terminal initially enters an area of the base station, when a power supply is switched from a turn-off state into a turn-on state, or when a handover at the time of reselection of a cell.

The base station may transmit a terminal capability request message for a sub-carrier spacing (SCS) to the terminal in step 720. The terminal capability request message may be information for inquiring about what sub-carrier spacing is available to the terminal.

The terminal may generate a terminal capability response message for the sub-carrier spacing and transmit the terminal capability response message to the base station when the terminal capability request message is received in step 722. The terminal capability response message may include capability information for a sub-carrier spacing available to the terminal. When the base station uses three sub-carrier spacings as described above, the terminal may transmit the terminal capability response message by including information on which sub-carrier spacing is available to the terminal in the terminal capability response message. When the base station provides more sub-carrier spacings than the method described with reference to FIG. 3, information thereon may be included in the terminal capability response message and transmitted. When the terminal capability response message is transmitted based on a mapping rule agreed in advance, an amount of transmitted message may be decreased. Further, the terminal capability response message may also be included in other messages and transmitted. In the other messages, a message for inquiring other capabilities of the terminal may be used.

When receiving the terminal capability response message from the terminal in step 722, the base station may configure information on sub-bands that may be allocated to the terminal, i.e., sub-bands of a group available to the terminal as a message and transmit the message. When the terminal uses sub-bands of three groups, and the base station uses all of them, the base station may configure information indicating that all the sub-bands of the three groups are available, and provides the information on the available sub-bands to the terminal. As another example, the base station uses sub-bands of seven groups, and the terminal uses sub-bands of three groups, but only sub-bands of two groups of the sub-bands of the groups that the base station may provide may be available. The base station may configure and transmit information on each the sub-bands of the groups available to the terminal.

When receiving the information on each of the sub-bands of the groups that are available in step 724, the terminal may generate a sub-band response message and transmit the sub-band response message to the base station in step 726. The sub-band response message may be configured to indicate that the information is received, and may also retransmit the information indicating the sub-bands are available from the base station to the base station together with the information indicating that the information is received.

When communication needs to be performed, the terminal may transmit a scheduling request message to the base station in step 730. If necessary, the terminal may transmit channel quality information together with or separately from the scheduling request message.

The base station may allocate a resource based on the channel quality information and provide allocated resource information to the terminal in step 732. The resource allocated to the terminal may use indexing information described above.

The base station may transmit data to the terminal using the allocated resource in step 734. Sub-carrier hopping may be performed based on the indexing information, and the sub-carrier hopping may be performed only in a sub-barrier in a corresponding group as described above.

The terminal may transmit channel quality information to the base station at a predetermined cycle or upon request from the base station as in step 740. In step 742, the base station newly allocates a resource based on the received channel quality information and transmits data to the terminal using the allocated resource.

It has been described that data can be transmitted based on the scheduling request message from the terminal; however, the same steps may also be applied when data to be transmitted to a corresponding terminal is received from a higher layer node. For example, when data to be transmitted to the terminal is received from a higher layer node, the base station may generate a paging signal and transmit the paging signal to the terminal. Accordingly, the terminal may transmit a paging response signal to the base station when an input responding to the paging signal exists. Therefore, when the paging response is received from the corresponding terminal, the base station may allocate a resource based on a previously received terminal capability response message and transmit the allocated resource information to the terminal. The base station may transmit data using the allocated resource information.

When channel quality information is received from the terminal periodically or upon request from the base station, the base station may use the channel quality information, and the frequency hopping methods described above may also be used. In addition, the resource allocation method may use PRB indexing.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for transmitting, by a base station, data in an orthogonal frequency division multiplexing (OFDM) system, the method comprising:
   transmitting, to a user equipment (UE), a UE capability information request message;
   receiving, from the UE, a UE capability information message,
   in response to the UE capability information request message;
   transmitting, to the UE, sub-band group information including sub-carrier spacing information, wherein the sub-carrier spacing information indicates a bandwidth for transmitting one resource block;
   receiving a scheduling request message for the UE;
   in response to receiving the scheduling request message, transmitting, to the UE, a resource allocation message including allocated resource information according to the sub-carrier spacing information included the sub-band group information; and
   transmitting, to the UE, the data using an allocated resource based on the allocated resource information.

2. The method for claim 1, wherein the sub-carrier spacing information includes information supporting a sub-band group of sub-band groups in an entire bandwidth of the base station configured as a multi-numerology band.

3. The method for claim 1, further comprising:
   receiving, from the UE, channel quality information;
   allocating a second resource of sub-carriers of the sub-band group based on the channel quality information;
   transmitting information based on the allocated second resource to the UE; and
   transmitting data using the allocated second resource.

4. The method for claim 1, further comprising:
generating and transmitting a paging signal to the UE, in response to receiving data to be transmitted to the UE, from a higher layer node;
allocating a third resource based on the received UE capability information message in response to receiving a paging response from the UE;
transmitting information on the allocated third resource to the UE; and
transmitting the data using the information on the allocated third resource to the UE.

5. The method for claim 1, wherein the resource is allocated using indexing for sub-bands of sub-band groups available to the UE.

6. The method for claim 1, wherein the resource is allocated by performing frequency hopping in sub-bands of sub-band groups available to the UE by using a predetermined rule.

7. The method for claim 1, wherein the sub-band group information further includes at least one of sub-band capable of communication with the UE.

8. The method for claim 1, wherein the sub-carrier spacing information indicates at least one of 15 kHz spacing, 30 kHz spacing, and 60 kHz spacing.

9. A base station for transmitting data in an orthogonal frequency division multiplexing (OFDM) system, the base station comprising:
a transmitter configured to convert one of data and a signal into a wireless band and transmit the converted one of data and signal to a user equipment (UE);
a receiver configured to down-convert a signal received from the UE and output the down-converted signal; and
a controller configured to:
control the transmitter to transmit, to the UE, a UE capability information request message,
control the receiver to receive a UE capability information message from the UE,
control the transmitter to transmit sub-band group information including sub-carrier spacing information to the UE,
control the receiver to receive a scheduling request message for the UE,
control the transmitter to transmit a resource allocation message including allocated resources according to the sub-carrier spacing information included in the sub-band group information, and
control the transmitter to transmit the data using the allocated resources to the UE,
wherein the sub-carrier spacing information indicates a bandwidth for transmitting one resource block.

10. The base station for claim 9, wherein the sub-carrier spacing information includes information supporting the sub-band one group of sub-band groups in an entire bandwidth of the base station configured as a multi-numerology band.

11. The base station for claim 9, wherein the controller is further configured to:
control the receiver to receive channel quality information from the UE,
allocate a second resource of sub-carriers of a sub-band group based on the channel quality information,
control the transmitter to transmit information based on the allocated second resource to the UE, and
control the transmitter to transmit data using the allocated second resource.

12. The base station for claim 9, further comprising a backhaul interface for communicating with one of a higher layer node and other base stations,
wherein the controller is further configured to:
generate a paging signal in response to receiving data to be transmitted to the UE from the higher layer node through the backhaul interface,
control the transmitter to transmit the paging signal to the UE through the base station receiver, in response to receiving data to be transmitted to the UE,
allocate a third resource based on the received UE capability information message in response to receiving a paging response from the UE through the receiver,
control the transmitter to transmit information based on the allocated third resource to the UE, and
control the transmitter to transmit the data using the information on the allocated third resource.

13. The base station for claim 9, wherein the controller is further configured to allocate the resource using indexing for sub-bands of sub-band groups available to the UE.

14. The base station for claim 9, wherein the controller is further configured to allocate the resource by performing frequency hopping in sub-bands of sub-band groups available to the UE using a predetermined rule.

15. The base station for claim 9, wherein the sub-band group information further includes at least one of sub-band capable of communication with the UE.

16. The base station for claim 9, wherein the sub-carrier spacing information indicates at least one of 15 kHz spacing, 30 kHz spacing, and 60 kHz spacing.

17. A method for receiving, by a user equipment (UE), data in an orthogonal frequency division multiplexing (OFDM) system, the method comprising:
receiving, from a base station, a UE capability information request message;
transmitting, to the base station, a UE capability information message in response to the UE capability information request message;
receiving, from the base station, sub-band group information including sub-carrier spacing information, wherein the sub-carrier spacing information indicates a bandwidth for transmitting one resource block;
transmitting, to the base station, a scheduling request message;
receiving, from the base station, a resource allocation message including allocated resource information according to the sub-carrier spacing information included the sub-band group information; and
receiving, from the base station, the data using allocated resources based on the allocated resource information.

18. The method for claim 17, further comprising:
measuring a quality of a received signal from the base station;
transmitting, to the base station, channel quality information based on the measured quality of the received signal;
receiving a second resource allocation message indicating a second resource of sub-carriers of a sub-band group; and
receiving data using the allocated second resource allocation message,
wherein the second resource of sub-carriers of the sub-band group is determined based on the channel quality information.

19. The method for claim 17, wherein the sub-band group information further includes at least one of sub-band capable of communication between the base station and the UE.

20. The method for claim 17, wherein the sub-carrier spacing information indicates at least one of 15 kHz spacing, 30 kHz spacing, and 60 kHz spacing.

21. A user equipment (UE) for receiving data in an orthogonal frequency division multiplexing (OFDM) system, the UE comprising:
- a transmitter configured to convert one of data and a signal into a wireless band and transmit the converted one of data and signal to a base station;
- a receiver configured to down-convert a signal received from the base station and output the down-converted signal; and
- a controller configured to:
  - control the receiver to receive, from the base station, a UE capability information request message,
  - control the transmitter to transmit, to the base station, a UE capability information message in response to the UE capability information request message;
  - control the receiver to receive, from the base station, sub-band group information including sub-carrier spacing information;
  - control the transmitter to transmit, to the base station, a scheduling request message;
  - control the receiver to receive, from the base station, a resource allocation message indicating allocated resource information according to the sub-carrier spacing information included the sub-band group information; and
  - control the receiver to receive, from the base station, the data using allocated resources based on the allocated resource information,
- wherein the sub-carrier spacing information indicates a bandwidth for transmitting one resource block.

22. The UE for claim 21, the controller is further configured to:
- control the receiver to measure a quality of a received signal from the base station,
- control the transmitter to transmit, to the base station, channel quality information based on the measured quality of the received signal;
- control the receiver to receive a second resource allocation message indicating a second resource of sub-carriers of a sub-band group; and
- control the receiver to receive data using the allocated second resource allocation message,
- wherein the second resource of sub-carriers of the sub-band group is determined based on the channel quality information.

23. The UE for claim 21, wherein the sub-band group information further includes at least one of sub-band capable of communication between the base station and the UE.

24. The UE for claim 21, wherein the sub-carrier spacing information indicates at least one of 15 kHz spacing, 30 kHz spacing, and 60 kHz spacing.

* * * * *